(12) United States Patent
Sasaki et al.

(10) Patent No.: US 8,649,763 B2
(45) Date of Patent: Feb. 11, 2014

(54) HIGHLY SECURED PORTABLE TELEPHONE SYSTEM AND INFORMATION SYSTEM

(75) Inventors: Yasuhiko Sasaki, Higashiyamato (JP); Masashi Yano, Kawasaki (JP); Hideo Munehiro, Hatano (JP); Noriyuki Sugiura, Saitama (JP); Toru Ishikawa, Isehara (JP)

(73) Assignee: Hitachi, Ltd., Tokyo (JP)

( * ) Notice: Subject to any disclaimer, the term of this patent is extended or adjusted under 35 U.S.C. 154(b) by 1583 days.

(21) Appl. No.: 12/219,898

(22) Filed: Jul. 30, 2008

(65) Prior Publication Data
US 2009/0088137 A1 Apr. 2, 2009

(30) Foreign Application Priority Data
Sep. 28, 2007 (JP) ................................. 2007-253031

(51) Int. Cl.
*H04M 1/66* (2006.01)
(52) U.S. Cl.
USPC ........... 455/410; 455/411; 455/415; 380/250; 380/270; 380/249
(58) Field of Classification Search
USPC ............... 455/410, 411, 415, 412.1; 380/249, 380/250, 270
See application file for complete search history.

(56) References Cited

U.S. PATENT DOCUMENTS

| 6,505,039 B1* | 1/2003 | Boatwright | 455/410 |
| 6,961,851 B2* | 11/2005 | Burritt et al. | 713/168 |
| 7,319,873 B2* | 1/2008 | Zhang et al. | 455/445 |
| 7,603,104 B2* | 10/2009 | Carter et al. | 455/411 |
| 2005/0170817 A1* | 8/2005 | Matsutaka | 455/415 |

FOREIGN PATENT DOCUMENTS

JP 2003-78624 9/2001

OTHER PUBLICATIONS

"Hitachi Personal Computer FLORA Se/FLORA bd Series", Hitachi Inspire the Next, CA-499Y, Jun. 2007, pp. 1-4, in Japanese with English translation.

* cited by examiner

Primary Examiner — Junpeng Chen
(74) Attorney, Agent, or Firm — Crowell & Moring LLP

(57) ABSTRACT

In order to solve the problem in that information relating to a specific purpose can be saved in the internal memory of a mobile apparatus on which a permanent memory is mounted while information relating to other purpose cannot be saved in the internal memory of the apparatus, the purpose of each telephone call is distinguished by sending a non-telephone type notice before transferring the call and thus the user can determine whether the call should be saved or not.

6 Claims, 18 Drawing Sheets

FIG. 15

| TELEPHONE ID | CLIENT ID |
|---|---|
| 03-1111-XXXX | 090-1111-xxxx |
| 03-2222-YYYY | 090-2222-yyyy |
| ext. 6789 | 090-3333-abcd |
| 050-1111-ZZZZ | 080-4444-zzzz |
| 050-2222-ABCD | 050-3333-efgh |

FIG. 16

| | |
|---|---|
| CLIENT NUMBER | 090-1111-xxxx |
| SENDER INFORMATION | TARO YAMADA 03-1234-yyyy |
| TYPE | 2 (SECURITY LEVEL) |

FIG. 18

| CLIENT ID | TYPE |
|---|---|
| 090-1111-aaaa | 1 |
| 090-2222-bbbb | 2 |
| 090-3333-cccc | 1 |
| 090-4444-dddd | 1 |
| 050-3333-eeee | 3 |

FIG. 21

| CLIENT ID | CHARGE CLASS |
|---|---|
| 090-1111-aaaa | 1 |
| 090-2222-bbbb | 2 |
| 090-3333-cccc | 1 |
| 090-4444-dddd | 1 |
| 050-3333-eeee | 2 |

…

HIGHLY SECURED PORTABLE TELEPHONE SYSTEM AND INFORMATION SYSTEM

CLAIM OF PRIORITY

The present application claims priority from Japanese patent application JP 2007-253031 filed on Sep. 28, 2007, the content of which is hereby incorporated by reference into this application.

FIELD OF THE INVENTION

The present invention relates to a terminal of a portable telephone or a mobile information device carried by the user, and the system of server, switchboard and the like for providing various services to the terminal, and in particular to a highly secured system designed for the object of preventing the leakage of information from the terminal.

BACKGROUND OF THE INVENTION

Traditionally, when telephone calls or mails are exchanged by using mobile information devices such as portable telephone, normally such telephone or mail information is stored by means of a durable storage unit mounted inside the device (hereinafter referred to as "internal storage"), and it is generally and widely managed by the user. Such a device enables the user to call up the information when the user needs it and use it, and provides convenience to the user.

For example, a portable telephone includes a telephone directory function, which can be used to register in advance telephone number and mail address information in the internal memory, and to select an item in the directory to send a call. And the information of calls or mails received by a portable telephone and that of calls or mails sent by the user from a portable telephone is generally stored in the internal memory of the portable telephone as historical information, and such information can be used in other occasions to retransmit the call or mail.

Thus, the possibility of storing information of telephone calls or mails in the storage of the portable telephone or mobile information system is desirable in that it provides convenience of providing the user with a convenient method of communication. However, on the other hand, saving in such an internal storage creates another problem, i.e. the problem of security.

For example, when a portable telephone is lost, the information saved in the internal storage of the portable telephone is stolen by a person other than the user of the portable telephone by using all the possible means (information leaks). Therefore, there is a problem in that such portable telephone or mobile information device cannot provide a high information security.

In view of such a problem, as shown below, means such as the one described in JP-A No. 2003-078624, "Hitachi Ltd., Security PC, Flora Series Catalogue, CA-499Y, issued in June 2007" was provided in the past.

JP-A No. 2003-078624 discloses a system enabling a customer and a store to talk without allowing the store to learn the telephone number of the customer by letting the customer and the store talk through a reservation and call management system. The use of such a system eliminates the possibility of the customers making direct calls to the store, and therefore the store receives no direct telephone calls from the customers, and there will be no problem of leakage of customer information from the store system. And the telephone number of the store does not remain (is not stored) in the customer's portable telephone, and only the telephone number of the reservation call system remains in its place. And therefore, the leakage of telephone number of the store from the customer's portable telephone is avoided.

"Hitachi Ltd., Security PC, Flora Se Series Catalogue CA-499Y, issued in June, 2007" describes a computer called Security PC. In such a device, independently from the Security PC operated by the user, a computer called "server" and disposed in a remote environment exists being connected with the network. In the security PC, no hard disk drive is mounted on the terminal operated by the user. In its place, all the information is stored in the server, and the information required by the security PC is obtained from the server through a network. In this way, the security PC enables to prevent the leakage of information by not storing any information in a durable memory.

SUMMARY OF THE INVENTION

The documents cited in the BACKGROUND OF THE INVENTION provide systems with a high security. However, there are still problems in such systems.

In other words, JP-A No. 2003-078624 cited above provides a system of managing reservation by the customer to the store and the corresponding call from the store to the customer without directly informing the store of the telephone number of the customer by disposing a reservation and call management system between the customer and the store. The method of using an intermediate management system for receiving a call temporarily and making a call in substitution constitutes a method of hiding the telephone number of the sender to the addressee of the call. However, it is impossible to make sure that the call information related to specific purposes sent from a cell phone does not remain by such a method.

In other words, according to the means disclosed in JP-A No. 2003-078624, when a call from the management system is received, or inversely when a call is made to the management system, the information still remains in the portable telephone as a call history, and this is not sufficient to secure security. Moreover, in the history of the portable telephone the history of calls for the first purpose (for example, for business purpose) and the history of calls for the second purpose (for example, private purpose) remain mixed. This means damaging operability when the portable telephone is used as the telephone for the second purpose. In other words, the call information for the first purpose that is useless when the portable telephone is used for the first purpose is displayed on the history screen of the portable telephone. When a call is to be made for the second purpose from among the history, the telephone number is selected from a history in which the call history for the second purpose and the call history for the first history are mixed, and this involves a greater difficulty than that of selecting simply among the history of calls for the second purpose. This will be particularly great problem when the number of calls for the first purpose is greater than the number of calls for the second purpose.

And according to the means disclosed in JP-A No. 2003-078624, there is a problem in that the respondent to a call cannot obtain the information on the caller before responding to the call. For example, when a store receives a call from a customer, according to the means described in the patent document mentioned above, the customer temporarily makes a call on the management system, which then makes a call on the store, and thus the customer's telephone number cannot be directly made available to the store, and therefore the store cannot learn the telephone number of the customer. However, in another case assumed by the present invention, such a means creates a problem. For example, in the case where the user decides whether to respond or not by confirming the information on the caller at the time of receipt. In other words, it is not desirable for enhancing security to save the information on the caller (telephone number and the like). However, this can be a problem when it is very convenient to provide temporarily the terminal with information on the caller at the time of receipt of the call.

Then, in "Hitachi Ltd. Security PC, Flora Se Series Catalogue, CA-499Y, issued in June 2007," it is made possible to enhance security by making it impossible to save information that will constitute a problem in case of a leakage by not mounting a device for durably saving the information on the client terminal. However, in such a client terminal the following problem exists. Specifically speaking, if no durable information memory exists, since it is impossible to save durably all types of information, there will be a problem when information desired to save and information not desired to save depending on the purpose coexist.

For example, in case of using a portable telephone, a problem develops when it is desired to save private calls sent and received in the telephone directory or the call history and not to save at all business calls sent and received. Since no durable memory is mounted on a client terminal such as the one described in the document described above, no call information related to business remain in the portable telephone and thus it is possible to provide a high security. However, with regard to private calls, in spite of the fact that they constitute information essentially desired to be saved, they are not saved just as the calls related to business, and no access is made to the server and they are not used even if it is desired to reuse them.

The objects of the present invention are to enhance security by not allowing information related to a specific purpose as described above to remain in the device and at the same to provide a system that enables to improve convenience by enabling to save information related to other specific purpose in the device. And another object of the present invention is to provide a system enabling to improve convenience by not allowing call information related to a specific purpose remain durably in the device and at the same time by providing a means for confirming temporarily the caller information at the time of receipt.

In addition, another object of the present invention is to provide a portable telephone system wherein it is possible to vary security level depending on a plurality of objects and it is possible to separate charges.

The present invention uses the following means in order to solve the problem in that, in a mobile apparatus with a durable memory mounted thereon, information related to a specific purpose is stored in the memory of the apparatus while it is impossible to make the information related to another object not subject to saving in the memory.

Incidentally, in the following description of the present invention, the term "telephone" means a means of talking that informs the user of sending and receiving a call by means of a ring and following the response confirming action of the user, enables the user to converse by voice. And the information related to call contains any one of the sender information, the addressee information, the starting time of conversation, the ending time of conversation, the coded data of phone call voice, the transfer path and the transfer time. And the transfer of calls means a processing performed by the switchboard, and the connection of a line for calls the receiving of which the switchboard controls itself with another line for calls the receiving and sending of which the switchboard controls itself. And the notification means is a means for unilaterally informing one another between two persons, and the communication means is a means for bilaterally exchanging information between two persons. And portable telephone and other mobile apparatuses are referred to as client terminals or simply as clients.

To begin with, in the present invention, a call to a client is received not directly by the client but is received by a telephone in which a switchboard connected with the server controls sending and receiving as a substitute. The switchboard has both the sending and receiving controlling function and the line connection function. Here, it is possible to realize receiving of a call to the client mentioned above by the switchboard immediately transferring the received call to the client. However, in this case the client will be in the same situation as receiving normal calls. In other words, in the client the information of the received call remains in the internal memory as historical information as it is. Therefore, in such a simple transfer, it is impossible to make sure that the information of received call related to the specific purpose does not remain in the terminal as the present invention tries to realize.

In view of such a situation, in order to solve the problem the present invention employs the following means.

Specifically, the present invention employs a portable telephone system that includes: a server, a switchboard, a telephone, a non-telephone type notification device, and a portable telephone, in which the server and the switchboard, the switchboard and the telephone, the server and the non-telephone type notification device, the non-telephone type notification device and the portable telephone, and the switchboard and the portable telephone are mutually connected; the server holds the correspondence data describing the relationship of correspondence between the specific number specifying the telephone and the specific number specifying the portable telephone; the switchboard, upon detecting the receipt by the telephone, notifies the server of the receipt of the call and the specific number of the telephone; the server, upon receipt of the notice of receipt and the specific number of the telephone, instructs the switchboard to hold the received call, and searches the correspondence data for the portable telephone corresponding to the specific number of the telephone, and notifies the non-telephone type notification device of the retrieved specific number of the portable telephone; the non-telephone type notification device, upon receipt of the specific number of the portable telephone from the server, transmits a non-telephone type notice to the portable telephone; the switchboard, upon receipt of the instruction of transfer from the server, transfers the received call on hold to the portable telephone; and the portable telephone classifies the type of received calls by the non-telephone type notice from the non-telephone type notification device, and refrains from saving the information relating to the received calls.

The use of the means as described above enables to avoid saving the information of the received calls relating to specific purpose in the portable telephone for the reasons described below.

When the telephone connected with the switchboard has received a call, the server which holds the correspondence table data describing the correspondence relationship between the specific numbers specifying the telephones and the specific numbers specifying the portable telephones can find out to which client the received call should be transferred. Then, the switchboard connected with the server holds provisionally the received call instead of transferring the same immediately and notifies the server of the receipt thereof. And the server notifies the client of the received call through another different means of notification (a non-telephone type means of notification). In this way, it will be possible to inform expressly the client that the call sent by the switchboard to the client following the notice is a call for a specific purpose (for example business).

The server can record the information of the arrived call without losing the same by starting to save the information relating to the received call as information incidental to the telephone after receiving the notice of received call from the server.

The client will be able to recognize that the call it receives immediately afterwards from the switchboard is one for specific purpose from the non-telephone type notice as described above, and beginning with the notice as the turning point, the information of the received call is not saved (or erased before the conversation ends or within a sufficiently short period of time after the end of conversation). In this way, it will be possible for the client to make sure that no information relating to calls for a specific purpose remains in the internal memory and at the same time it will be possible to make sure that such information is saved in the server.

A means for realizing the non-telephone type notification mentioned above is, for example, the so-called SMS (short mail service), but this is not an exclusive one. As a non-telephone type notification means, it is desirable that the adopted means is an instantaneous notification means. The instantaneous notification unit refers to a unit capable of notifying without fail within a fixed period of time from the moment of the received call, and is different from a notification means without a fixed time limit. When an instantaneous notification means with a fixed time limit is used as the non-telephone type notification means mentioned above, it is possible to prevent the problem of sequence of the notice of received call and the transfer of call being reversed by instructing the switchboard to transfer after the time limit had elapsed.

The prior non-telephone type notification means that precedes the receipt of call mentioned above can adjust the timing of call transfer without fail by sending back the confirmation of receipt of the notice from the client to the server (FIG. 12). In other words, the switchboard connected with the server holds the received call, and according to the instruction from the server to which the confirmation of receipt of the notice had been sent back, transfers the call on hold (including the case of connecting line with the call it had sent). By so doing, the switchboard connected with the server, which has confirmed that the prior notification means had reached without fail, can prevent the problem that the notice of receipt and the transfer of call are reversed and get out of sequence.

Then, in the present invention, the following means is used in order to solve the problem in that, at the time of sending call from the client, it is impossible to make a mobile apparatus provided with a durable memory saves information related to a specific purpose in the memory of the apparatus and to make the same mobile apparatus avoid saving information related to other objects.

In other words, the present invention employs a portable telephone system including: a server, a switchboard, a telephone, a non-telephone type communication device, and a portable telephone, in which the server and the switchboard, the switchboard and the telephone, the server and the non-telephone type communication device, the non-telephone type communication device and the portable telephone, and the switchboard and the portable telephone are mutually connected; the server holds number data including a plurality of telephone numbers; the server, upon accepting the connection from the portable telephone through the non-telephone type communication device, sends at least a part of the number data held by the server to the portable telephone through the non-telephone type communication device; the portable telephone sends the predetermined items in the number data to the server through the non-telephone type communication device and sends a call to the telephone; the switchboard notifies the server of the receipt of the call from the portable telephone to the telephone; the server searches for the telephone number corresponding to the specific items received from the portable telephone and notifies the retrieved telephone number to the switchboard; the switchboard, upon receipt of the notice of telephone numbers retrieved from the server, transfers the received call from the portable telephone to the retrieved telephone number; and the portable telephone classifies the type of calls by the connection with the server through the non-telephone type communication device, and specifies the information relating to the calls as one not to be saved.

The use of the means as mentioned above enables to save information of calls sent out relating to a specific purpose in the server and not to save in cell phones for the reasons described below.

For sending calls also, the client does not make a direct call to the telephone number of the addressee but connects to the server instead by using a means other than telephone (hereinafter referred to as "the non-telephone type communication means"). In this way, in case of a call sent successively from the client, it will be possible to the server that it is necessary to save the information relating to the call, and it will also be possible for the client to detect itself that the call is a call for a specific purpose.

Then, since the server holds the telephone directory data or call history data as number list data, it will be possible to send a part of the data. The client who receives this data selects some items from the information sent and informs the server thereof. By this measure, the server specifies the telephone numbers corresponding to the chosen items by searching the number list data. In other words, it will be possible to specify the telephone number of the addressee to whom the client intends to make a call. Then, the server stores temporarily the combination of the specific number specifying the client and the telephone number of the addressee.

Then, the client makes a call to the telephone connected with the switchboard connected with the server. In making such a call, the number of the telephone which will be the addressee of the call from the client may be a fixed number, or may be a number notified in advance by the server. The switchboard having detected the incoming call to the telephone, upon being notified by the server of the telephone number of the addressee to whom the client intends to call, transfers the call received from the client to this number.

In this way, it will be possible that both the server and the client discern that the call they send is a call for specific purpose, and that each of them proceed to the processing of saving and the processing of not saving the call information, the server saving the information relating to the call relating to the specific purpose and at the same time the client taking steps to make sure that the information relating to the call of specific purpose may not remain in the internal memory.

It will be possible to save the information relating to calls of a specific purpose in the internal memory of the portable telephone and make sure that the information relating to calls of another object would not be saved in the internal memory of the portable telephone. And it will be possible to save in the server the information of call that is not saved in the portable telephone. This enables to provide a portable telephone system having a high security and convenience.

BRIEF DESCRIPTION OF THE DRAWINGS

FIG. 15 is a table of correspondence data used in the present invention;

FIG. 16 is a table of type data in the notice of the present invention;

FIG. 18 is a table of type imparted by the model of the client in the present invention;

FIG. 21 represents the charge separating means 2 in the present invention.

DETAILED DESCRIPTION OF THE PREFERRED EMBODIMENT

First Embodiment

Figure 1:
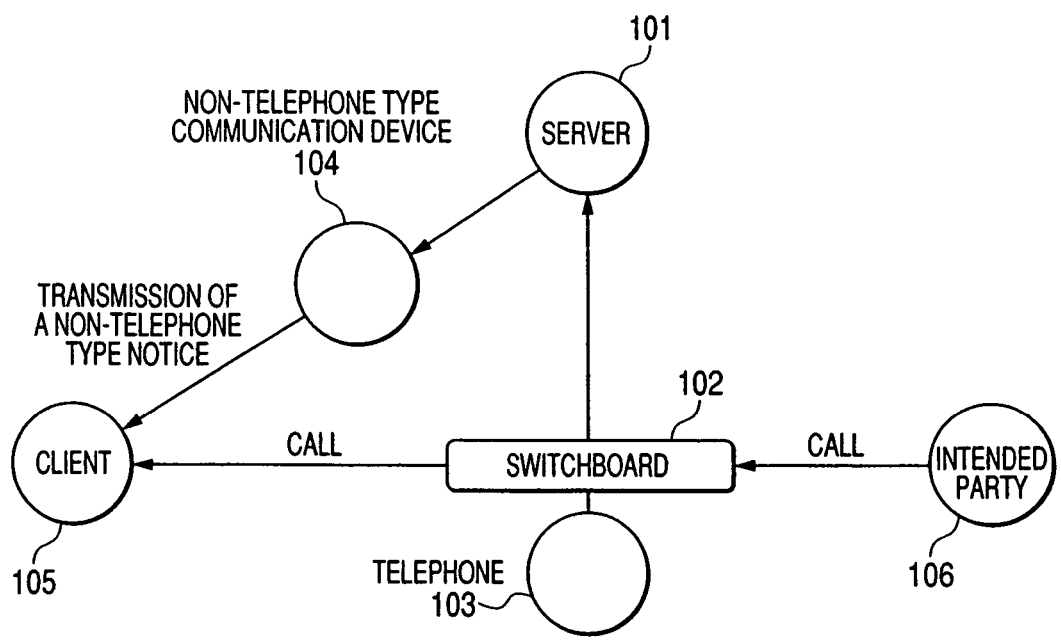
FIG. 1 is the block schematic diagram 1 of the present invention.

Regarding the first embodiment of the present invention, we will describe the case of received call from the terminal of the intended party (106, hereinafter referred to as "the intended party") to the client with reference to FIG. 1. To begin with, the intended party (106) is not directly informed of the telephone number of the client (105). In its place, it is informed of the telephone number of the telephone (103, hereinafter referred to as "the center telephone") managed by the switchboard (102) connected with the servers (101) disposed in the company premise or the center and the like. This eliminates the possibility of any calls reaching from the intended parties directly to the telephone of the client. In its place, the client receives calls from the center telephone (103) for any calls it may receive.

The switchboard (102) having detected the incoming call to the center telephone, upon detecting the received call, notifies the server (101) thereof together with the number of the center telephone. Then, the server identifies which is the client telephone corresponding to the center telephone by searching the correspondence table data as shown in FIG. 15. Here, in lieu of giving an instruction to the switchboard (102) that the call received by the center telephone be immediately transferred to the client, the server (101) instructs the switchboard to hold the same provisionally, and sends the same to the client (105) through a notification means different from telephone (non-telephone type notification device 104). Then, the server instructs the switchboard (102) to transfer the received call to the client (105) (or send itself a call to the client and connect the received call to line) and the switchboard (102) proceeds to a transfer processing.

Here, the non-telephone type notification means expressly notifies the client (105) that the call sent by the switchboard (102) following a notice is a call for a specific purpose (for example business). Therefore, the client availing itself of this opportunity can decide not to save the information relating to the transferred calls from the switchboard since then (or even if the call information is provisionally saved, it is deleted before the conversation ends or in a sufficiently short period of time after the end of conversation). This will enable the client (105) to take steps to make sure that no information relating to any call of a specific purpose remains within itself. On the other hand, the server (101) which, upon receiving a notice of received call from the switchboard, begins saving the information relating to the call, can save the information of the call without losing the same.

Incidentally, in the present invention, in case of making a call of a different purpose separate from the specific purpose stated above, the intended party is informed of the telephone number in the same way as the use of the ordinary portable telephone. Since the intended party makes a call on this telephone number, the function of received call history that the ordinary portable telephone has is used in the same way, and the information is saved in the internal memory of the portable telephone. In this way, with respect to calls of a specific purpose, the information is not saved in the memory of the portable telephone, while with respect to calls of another object, the information can be saved in the memory of the portable telephone.

Figure 12:
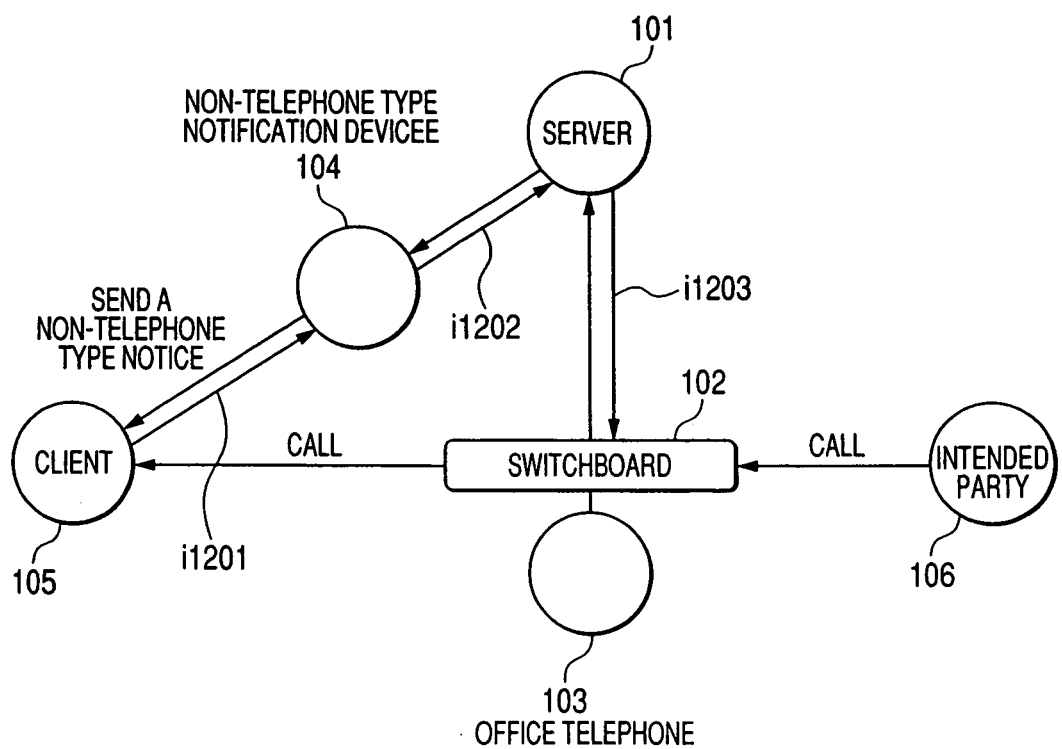
FIG. 12 is the block schematic diagram 3 of the present invention.

The prior non-telephone type notification means preceding the call transfer mentioned above can adjust the chronological timing of call transfer with an increased certainty (FIG. 12). In other words, the switchboard (102) connected with the server (101) holds the received call, and the switchboard transfers the received call held by the return of the first confirmation of receiving notice (i1201) from the client (105) to the non-telephone type notification device (104), that of the second confirmation of receiving notice (i1202) from the non-telephone type notification device (104) to the server (101), and that of the third confirmation of receiving notice (i1203) from the server to the switchboard (102). The adoption of such a system will enable to avoid the problem of sequence of the notice of received call and the transfer of call (or line connection) being reversed since the switchboard (102) confirmed that the prior notification means had certainly arrived.

In the received call by the client at the beginning, according to the present invention, the switchboard (102) connected with the server (101), instead of simply transferring the call, holds temporarily the received call at the center and sends the information related to the call to the client (105) through a notification means different from telephone (non-telephone type notification means, 104). Then the switchboard (102) transfers the received call to the client (105). And when, as a form of such a transfer, the switchboard itself sends a call to the client and the received call from the intended party is connected to the line, the sender information ceases to be that of the original sender. Even in such a case, if the client had notified in advance whose call would arrive by a non-telephone type notice by the third means of the present invention, the sender of the received call will not be unclear. In other words, the non-telephone type notification means described above, following a notice, notifies expressly the client (105) that the call sent from the switchboard (102) is a call for a specific purpose (for example business) and notifies at the same time who had sent the call.

And in the third aspect of the present invention, the server can also search a variety of retrievable information by using the telephone number of the sender as a key and notify by adding the detailed information of the sender to the telephone number. For example, the server can of course add the name of the owner of the telephone number, the information of the organization to which he or she belongs, the history of the past conversations, and the classification of his or her unique customers, as well as the importance and urgency of the received calls so that the user of the client may be able to make an accurate decision whether he or she should respond to the call or not.

The user of the client can set in advance the system whether to transfer the call by their own will. The server holds inside the information for deciding whether a call should be transferred or not, and requests the switchboard to proceed to a transfer processing according to this information. For example, it is possible to set the transfer of call only in the case of absence from the office and to receive the incoming call by a fixed telephone when the user of the client is in the office. Such an instruction of transfer of the user may be given when he or she is in the office, or may be given by a portable telephone by remote control when he or she is out of the office.

Figure 2:
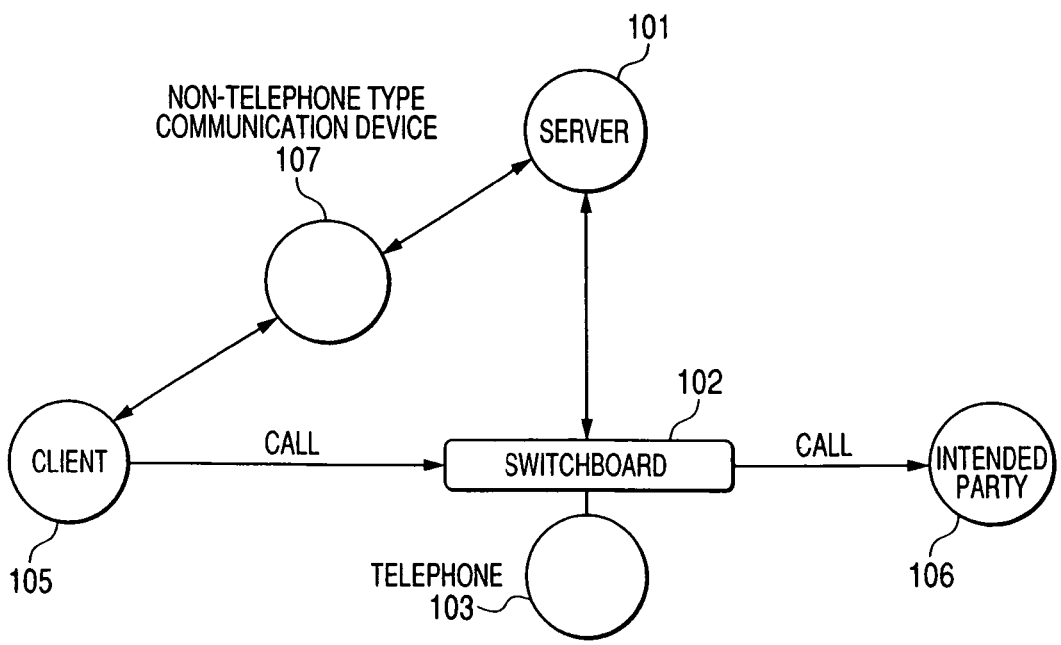
FIG. 2 is the block schematic diagram 2 of the present invention.

Regarding the second embodiment of the present invention, we will describe the process of sending a call from the client (105) to the intended party (106) with reference to FIG. 2. To begin with, before sending a call, the client (105) connects with the server (101) or logs in through the non-telephone type communication device (107). This log in enables the server to recognize which client keeps on trying to call and to start saving the information relating to the subsequent calls as information belonging to this client. And the client detects itself that the information relating to the subsequent calls is specified as not subject to saving. Here, the communication means through a non-telephone type communication device may be whatever communication means other than telephone such as so-called Internet network or closed-type data network.

Then, the client (105) requires the information on telephone of the addressee for sending a call, and for such information, telephone numbers may be acquired from the server (101) and itemized information for specifying the telephone numbers other than the telephone numbers themselves may be used. Such information is acquired from the server through the non-telephone type communication devices as telephone directory data or call history data. Then, the client chooses specific items from the telephone directory or the call history acquired from the server, and sends the information corresponding to the chosen items to the server. Thereafter, the client (105) sends calls to the telephones (103) to and from which calls sent and received are controlled by the switchboard (102) instead of directly making calls to its intended parties (106). With regards to calls sent to such a telephone (102), if it is automatically sent out following the choice of the items mentioned above, the number of operational steps can be saved. Upon detecting a call sent by the client mentioned above as a received call, the switchboard (102) notifies the server (101) of the same together with the telephone number of the sender (client).

As described above, the server (101) is notified in advance in the form of log in and the choice of items which client (105) is trying to make a call to where. In other words, the server can determine the client having which telephone number is trying to make a call to which telephone number. The server (1011) having received a notice of received call from the switchboard (102), upon specification of call received from the client of which telephone number, notifies the switchboard (102) to which telephone number the client is trying to make a call.

Upon notification of the telephone number of the addressee (106) intended by the client (105) of the sender of the call received by the switchboard (102) from the server (101), the switchboard (102) transfers the received call from the client to this telephone number (or connect the call it had sent to the line). This establishes the conversation between the client (105) and the intended party (106).

When the conversation ends, the switchboard (102) notifies the server (101) of the end of conversation. By this notice, the server (101) saves the information it had begun saving in advance as the history of conversation belonging to the client (105). On the other hand, as a result of the end of conversation, the client (105) deletes any information relating to calls after the log in it had saved in the memory. This enables to save the information relating to a specific purpose in the memory within the server (101) without saving the same in the memory within the client (105).

Figure 5:
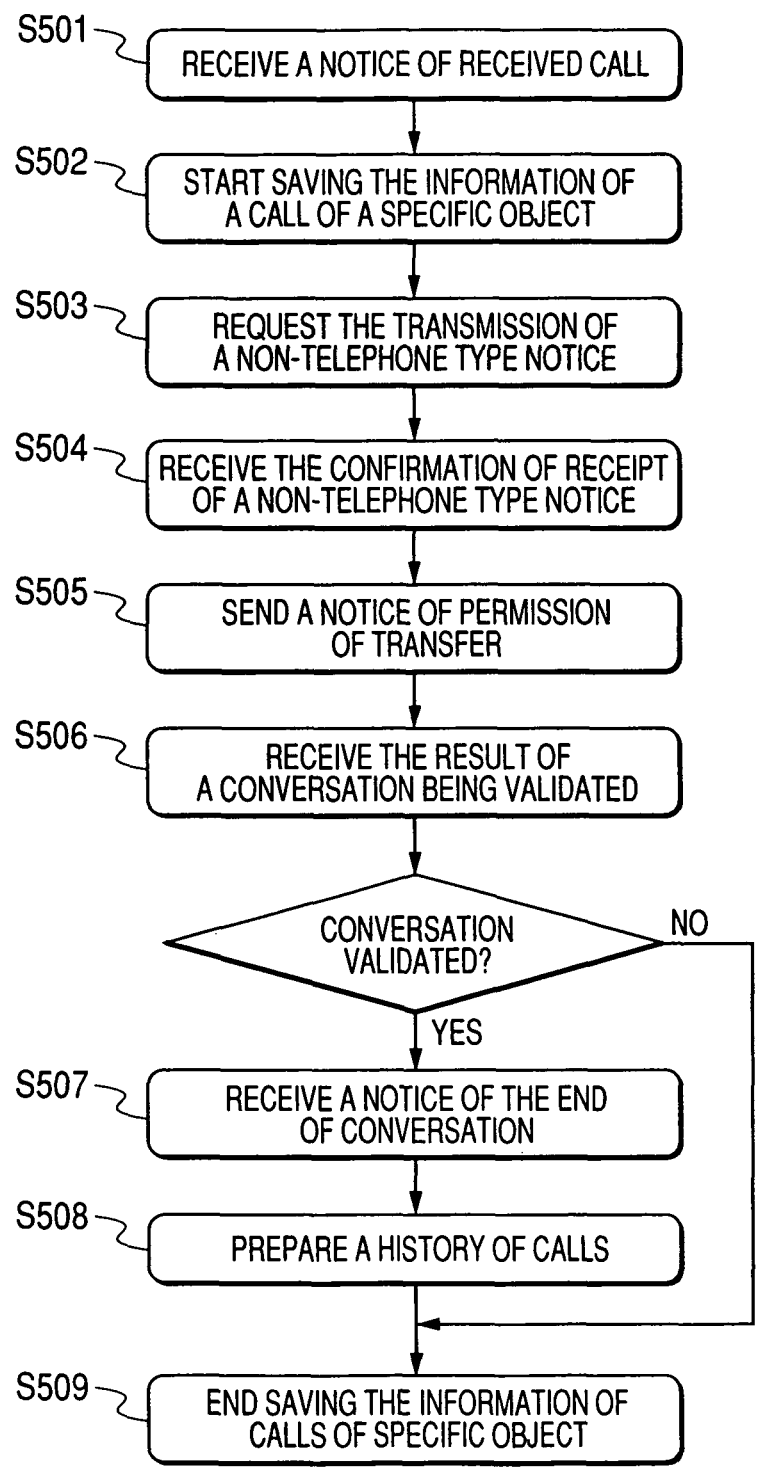
FIG. 5 is the functional flow chart 1 related to the present invention.

In the embodiment of the present invention shown in FIG. 5, the client chooses specific items among the telephone directory and the history of calls obtained from the server, and sends the information corresponding to the chosen items to the server. After sending the chosen items to the server, the client (105) makes a call to a telephone (103) of which sending and receiving calls is controlled by the switchboard (102) instead of making direct calls to the intended party (106), and then the switchboard transfers the calls from the client to the intended party. In this case, it is possible to realize conversation by the switchboard itself making calls to the client, and also to intended parties and by connecting these two lines. However, in this case, the client must actually receive the incoming calls in spite of the fact that it sends itself calls. Since this is different from the normal telephone operation procedure, it creates a great sense of discomfort to the user. And since the procedure of operation is separated into two steps of sending a call and responding to the received call, convenience in operation is reduced. When the means of the present invention is used, a call is sent in the same way as the normal sending of call, and the user need not stand ready waiting for incoming calls, and the operation is a one-step operation as the normal telephone call and therefore its operability is not damaged.

Figure 3:
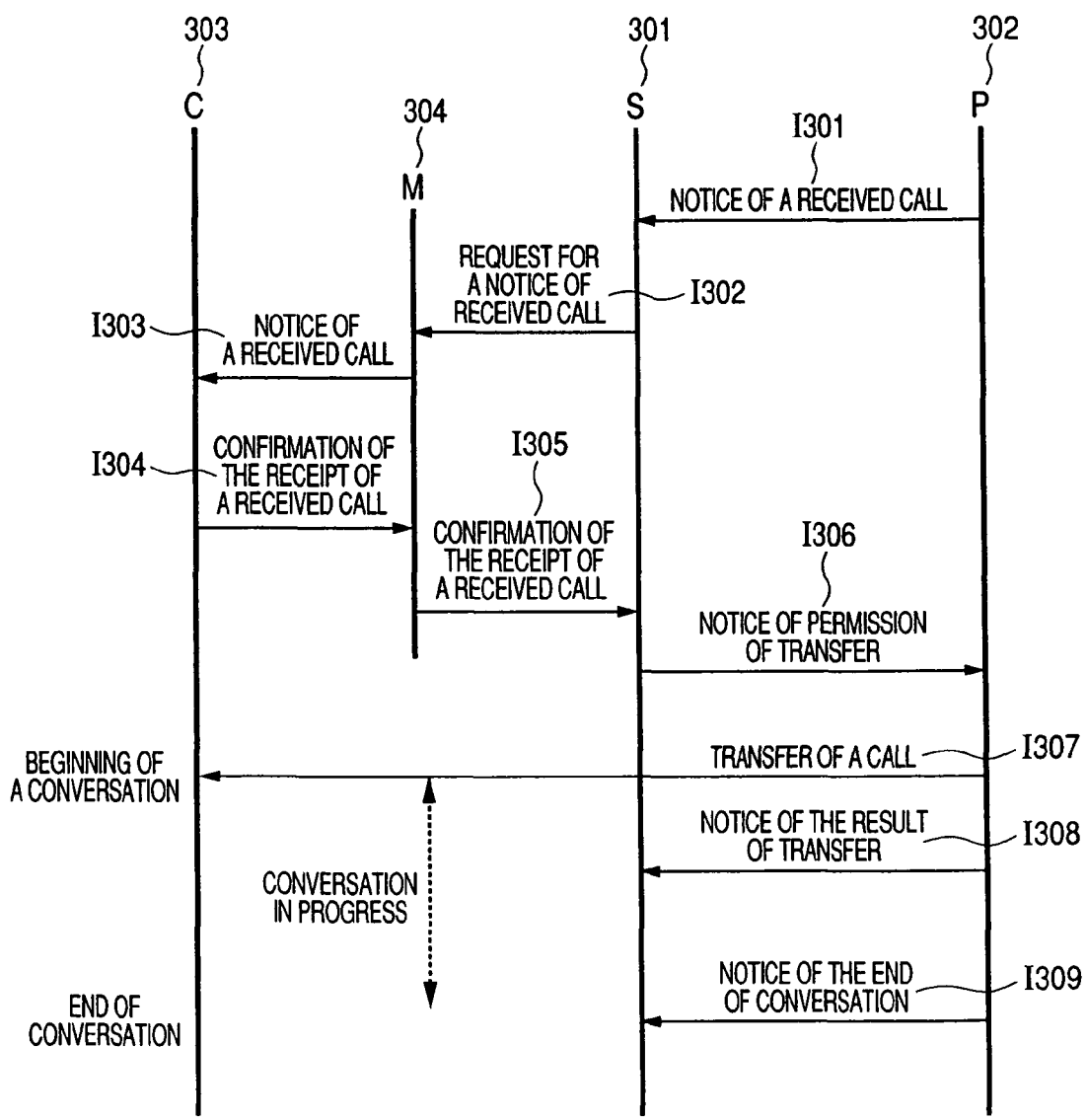
FIG. 3 is the interface 1 between device groups related to the present invention.

We will describe below how a plurality of related devices deal with a call received by a telephone connected with the switchboard in the portable telephone system of the present invention with reference to FIG. 3. Here, a plurality of related devices mean a server, a switchboard, a non-telephone type notification device, and a client, and we will show their respective behavior with respect to each other with the passage of time.

To begin with, when a call is received by a telephone connected with a switchboard, the switchboard (302) detects the same, and notifies the server (301) of the received call (i301). The server uses the telephone number of the received call to search the correspondence table data saved inside and identifies the client.

Then the server (301) transmits the information of the client to the non-telephone type notification device (303) and requests the transfer of the non-telephone type notice (i302). The non-telephone type notification device sends the sender information to the client (i303). The client (303) recognizes that the succeeding call is a call for a specific purpose, and starting treating the information relating to the call as information not to be saved. Then, it returns the confirmation of receiving a non-telephone type notice to the non-telephone type notification device (i304). The non-telephone type notification device having received the confirmation returns the similar confirmation to the server (i305).

Upon receipt of the confirmation, the server (301) sends to the switchboard (302) a notice of authorizing the transfer of received call to the client. Upon receipt of this notice, the switchboard (302) transfers the received call it is holding to the client (or connects the call it is sending to the client with the line) (i307). The switchboard notifies the server whether the conversation was established or not as the result of transfer (i308).

When the conversation ends, the switchboard (302) notifies the server (301) of the end of conversation (i309) Upon receipt of the same, the server (301) prepares the call history information relating to the client (303). And the client (302) that has detected itself the end of conversation deletes any data saved in the internal memory that it had recognized not to be saved due to the non-telephone type notice mentioned above. By the procedure described above, it will be possible to save the information relating to the intended party (sender) in the server (301) without saving the same in the client (303).

Figure 4:
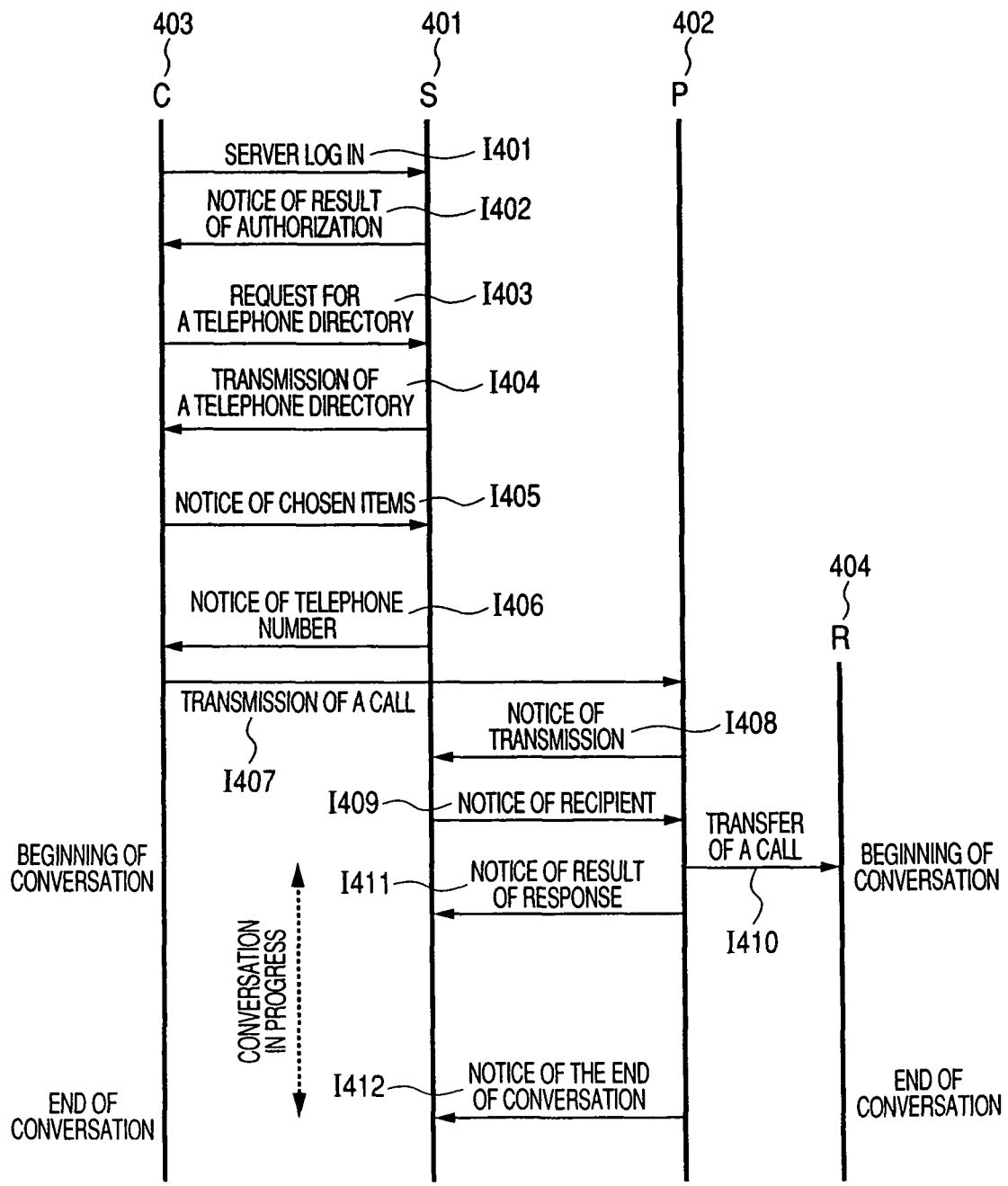
FIG. 4 is the interface 2 between device groups related to the present invention.

Then, we will show how the calls received from the clients will be treated by a plurality of related devices in the portable telephone system of the present invention with reference to FIG. 4. For each of the server, switchboard, and client as a plurality of related devices, we will show their respective behavior with respect to each other with the passage of time.

To begin with, the client (403) tries to log in the server (401) before making a call (i401). The server (401) investigates whether the client that tried to log in is a user regularly registered, and if it is registered, the server sends a notice of successful authentication to the client. (402) (i402). If it is not registered, it sends a notice of unsuccessful authentication to the client. If the authentication is successful, the server considers the subsequent calls are information related to a specific purpose and treat them as the subject of saving. And the client also considers the subsequent calls as calls of a specific purpose, and start treating them as not to be saved. Then, the client (403) sends a request to the server in order to obtain the call information saved in the server (401) (i403). Upon receipt of the same, the server (401) sends the telephone directory information requested to the client (403) (i404). Incidentally, such information is not limited to telephone directory but may be a history or a list of telephone numbers used frequently.

When the user of a client chooses the items of the intended party to whom he or she wishes to call, the client sends the chosen item information to the server (i405). The server (401) notifies the client (403) of the telephone number of the telephone connected with the switchboard to the client (403) (i406). Incidentally, if such telephone number is fixed, this information is not necessarily required. The client sends a call by using this telephone number (i407). When the switchboard (402) connected with the server detects a received call from the client, upon holding the call, it notifies the server of the telephone number of the sender (client) (i408) The server investigates whether the client (403) of the telephone number notified had previously chosen the item of the telephone directory, and if yes, notifies the switchboard (402) of the telephone number corresponding to the item chosen, in other words the telephone number of the intended party with whom the client intends to talk (i409).

The switchboard (402) transfers the call from the client (403) being held to the telephone number notified by the server (401) (connects the call it had sent with the line) (i410). When the intended party (404) responds to the call, the call between the client (403) and the intended party is established, the switchboard (402) notifies the server (401) that the call has been established, and if the call is not established, the switchboard (402) notifies that the call was not established (i411).

When the call has ended, the switchboard notified the server (401) thereof (i412). Upon receipt of this notice, the server (401) prepares the historical information of the call relating to the client (403). And the client (403) which has detected itself the end of call deletes any data saved in the internal memory specified as data not to be saved after the successful authentication during the previous server log in.

By the procedure described above, it will be possible to save the information of the intended party (sender) in the server (401) while such information is not saved in the client (403).

FIGS. 5-8 describe the respective processing of the server, the switchboard, the non-telephone type notification device and the client when a call is received by a telephone connected with the switchboard as the time passes.

To begin with, FIG. 5 shows the processing of the server. Upon receipt of a notice of received call from the switchboard (S501), the server starts recording the same in order to save finally the information of the call in its internal memory as a call for a specific purpose (S502). Then, the server sends the client information received from the switchboard to the non-telephone type notification device, and requests to send the non-telephone type notice to the client (S503). Then, the server receives the notice receipt confirmation requested from the non-telephone type notification device (S504), and sends the transfer authorization notice to the switchboard (S505). The server receives the result of establishment of call from the switchboard (S506). Upon receipt of a notice of end of conversation from the switchboard (S507), the server prepares the history of call (S508) and saves the same in its memory. And finally, the server ends the treatment as a call for a specific purpose (S509).

Figure 6:
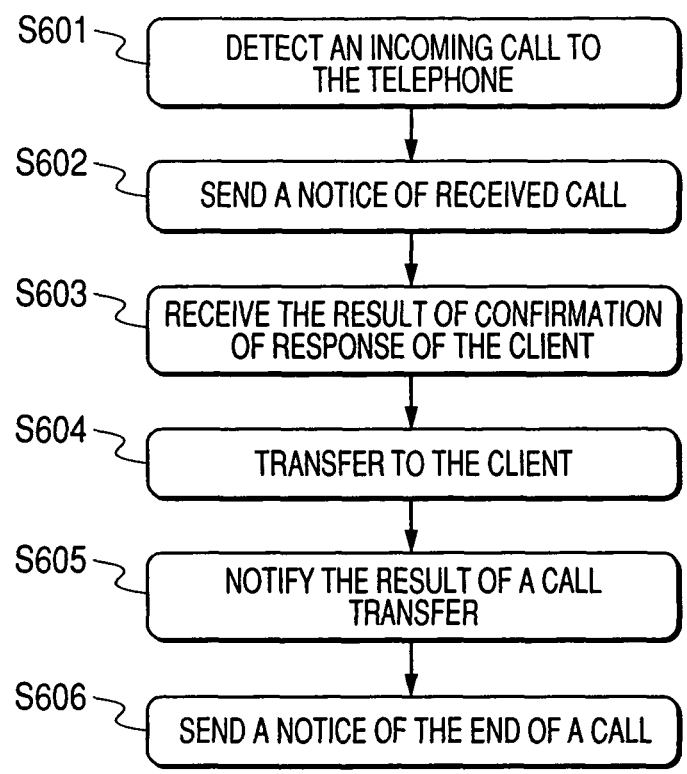
FIG. 6 is the functional flow chart 2 related to the present invention.

Then, FIG. 6 shows the processing of the switchboard. Upon detecting the receipt of a call by the telephone connected with the switchboard (S601), the switchboard holds the received call and notifies the server of the received call (S602). Then, upon receipt of a transfer authorization notice from the server (S603), the switchboard transfers a received call it is holding to the client (S604). The switchboard notifies the server of the result of call transfer (S605), and when the call has ended, it sends a notice informing the end of conversation to the server (S506).

Figure 7:
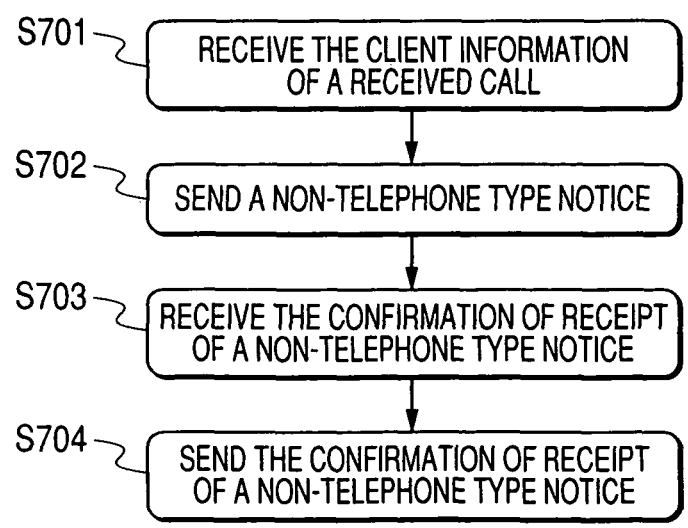
FIG. 7 is the functional flow chart 3 related to the present invention.

Then, FIG. 7 shows the processing of the non-telephone type notification device. To begin with, the device receives the client information of the received call from the server (S701). Then, the device gives a non-telephone type notice to the client (S702). Upon receipt of the result of receiving this notice from the client (S703), the device sends the same to the server (S704).

Figure 8:
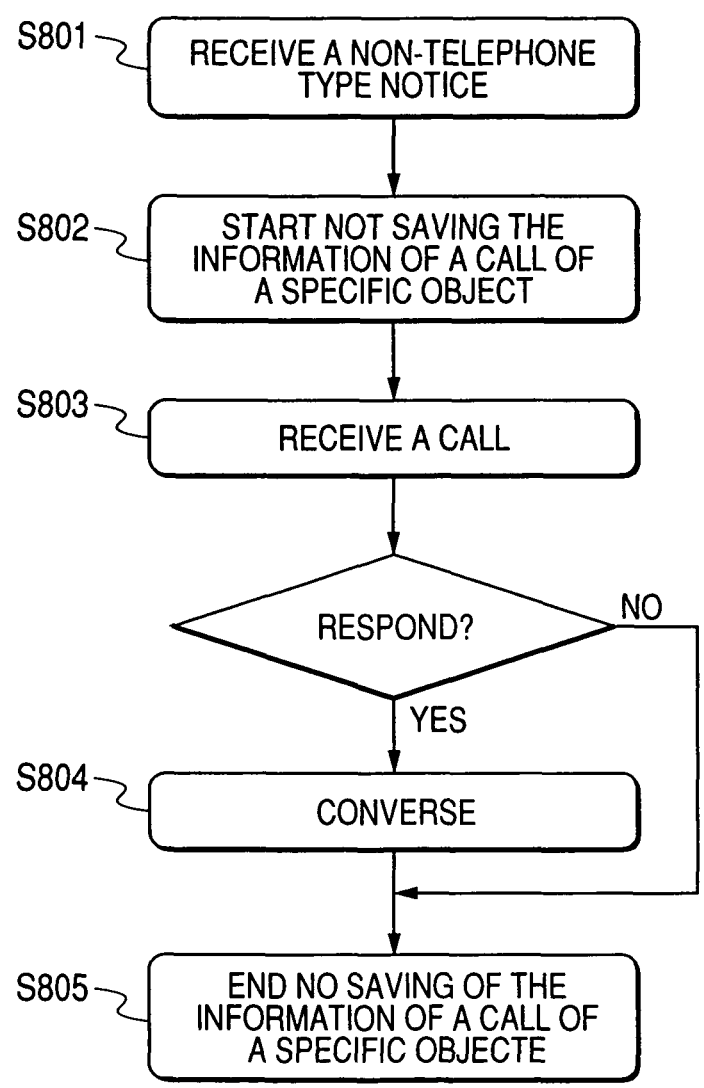
FIG. 8 is the functional flow chart 4 related to the present invention.

Finally, FIG. 8 shows the processing of the client. Upon receipt of a non-telephone type notice from the server (S801), the client recognizes that the subsequent calls are calls for a specific purpose, and starts processing the subsequent calls of which it was notified as not subject to saving (S802). Upon the receipt of a call (S803), in case of responding thereto, the client proceeds to conversation (S804), and at the end of the conversation, if any data not to be saved is saved in the internal memory, the client deletes the same (S805).

Figure 9:
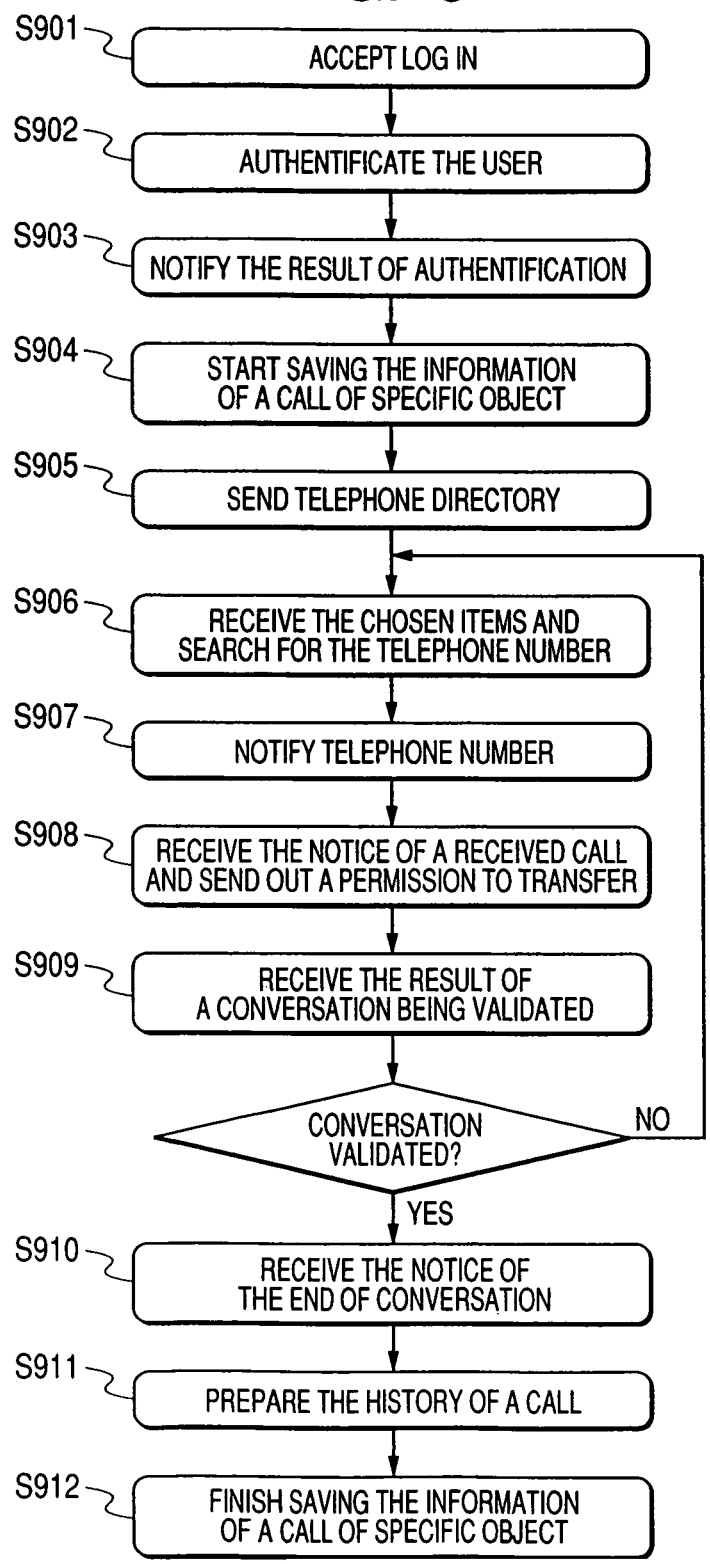
FIG. 9 is the functional flow chart 5 related to the present invention.
Figure 10:
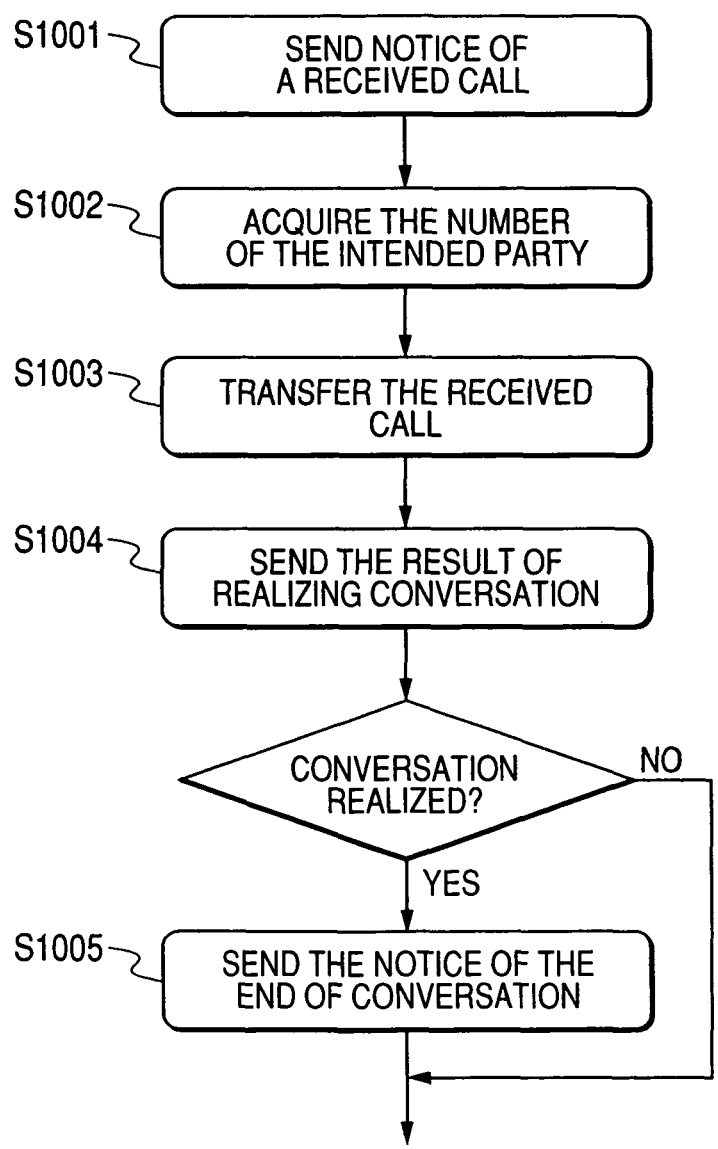
FIG. 10 is the functional flow chart 6 related to the present invention.
Figure 11:
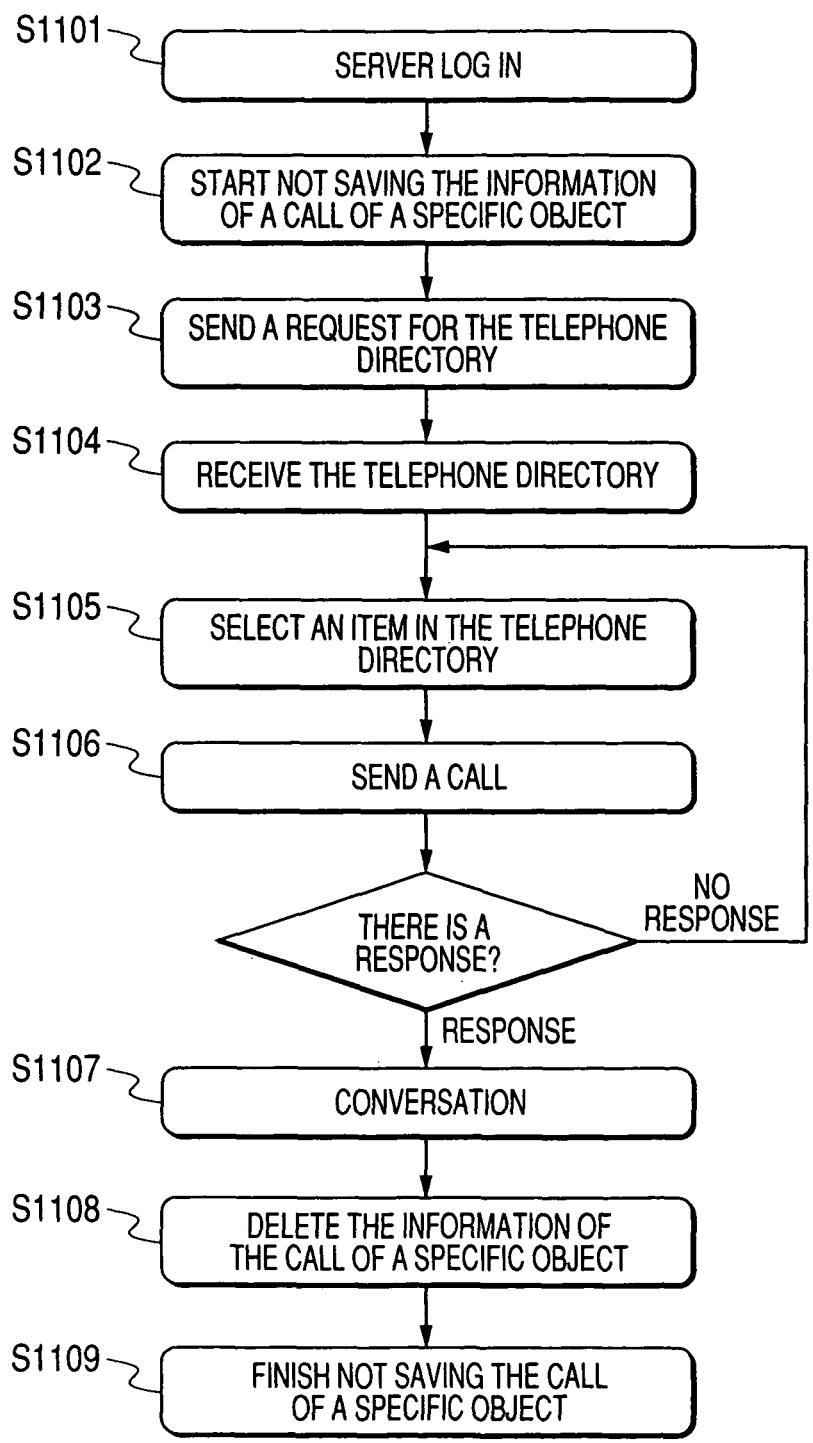
FIG. 11 is the functional flow chart 7 related to the present invention.

FIGS. 9 to 11 show the respective processing of the server, switchboard and client as the time passes when the client sends a call.

To begin with, FIG. 9 shows the processing of the server. Upon accepting the log in from the client (S901), the server authenticates whether the client is registered or not (S902). The server notifies the client of the result of authentication (S903). If the client has passed the authentication, the server discerns the subsequent calls as calls for a specific purpose, and starts recording them as information to be saved finally in the internal memory (S904). It is needless to say that the server sends the telephone directory information to the client (S905). The object of sending such information needs not necessarily be the telephone directory, and may be either the call history of the client or the list of frequently used telephone numbers. Upon receipt of the items chosen by the client from the telephone director sent (S906), the server notifies the client of the number to which the client is allowed to send calls (S907). This number is the telephone number of the telephone the incoming calls to which are controlled by the switchboard, and may be a fixed number or a variable number corresponding to the client. In the case of a fixed number, this telephone number may be saved in advance in a portable telephone, and the step of this notice may be omitted. Upon receipt of a notice of received call from the client, the server sends a transfer authorization notice to the switchboard (S908), and the server is notified of the result of establishment of conversation (S909). If the conversation is established, the server receives a notice of the end of conversation from the switchboard (S910), and prepares the information on this call as call history information belonging to the client (S911). Finally, the server terminates the treatment as a call for a specific purpose (S912).

Then, FIG. 10 shows the processing of the switchboard. To begin with, upon detection of a received call from the client, the switchboard notifies the server thereof (S1001). Upon receipt of the telephone number of the addressee of call corresponding to the client and the transfer authorization notice from the server (S1002), the switchboard transfers the received call to the telephone number (or send itself a call to the client and connect the received call with the line) (S1003). The switchboard notifies the server of the result of establishment of conversation (S1004) and at the end of the conversation notifies the server thereof (S1005).

Finally, FIG. 11 shows the processing of the client. Upon logging in the server (S1101), the client discerns the subsequent calls as calls for a specific purpose, and starts treating them as information not to be saved in the internal memory (S1102). The client sends a request to the server in order to obtain the telephone directory information from the server (S1103), and receives the telephone directory information (S1104). The client chooses the item corresponding to the telephone number to which it wishes to make a call from among the telephone directory information, and notifies the server thereof (S1105). Then, the client sends a call (S1106) and when the intended party does not respond, returns to processing so that the same or a different item may be chosen, and if a response is obtained, the client proceeds to a conversation (S1107). At the end of the conversation, if the telephone directory or any information on which it is desired to make a call is saved in the internal memory of the portable telephone, this is deleted (S1108). Finally, the treatment as a call for a specific purpose is terminated (S1109).

FIGS. 13A to 13D show the configuration of devices related to the present invention. The devices shown in FIG. 1 include a server (101), a switchboard (102), a non-telephone type notification device (104) or non-telephone type communication device (107) and the like, and these devices may be contained in separate enclosures as separate devices as shown in the figure. Moreover, such a configuration is not limitative.

Figure 13A:
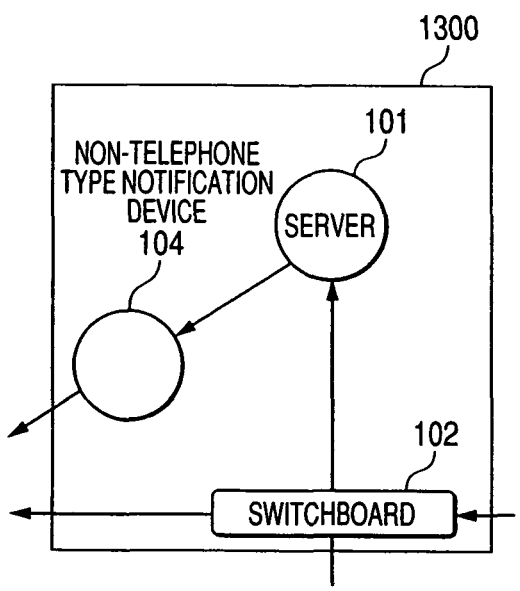
FIG. 13A, FIG. 13B, FIG. 13C, and FIG. 13D represent configuration diagrams of the present invention.

For example, the three devices mentioned above may be contained in an enclosure as shown in FIG. 13A. In this case, since all the devices other than the client are integrated in an all-in-one type device, this structure has an advantage in that this can replace the traditional switchboard as a highly secured switchboard.

Figure 13B:
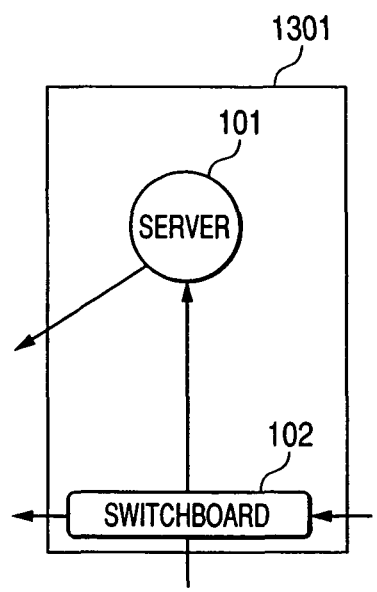

And, a server and a switchboard may be contained in a single enclosure to constitute an integrated all-in-one device as shown in FIG. 13B. For example, this is suitable in the case where the switchboard alone is replaced in combination with the existing device as a non-telephone type notification device.

Figure 13C:
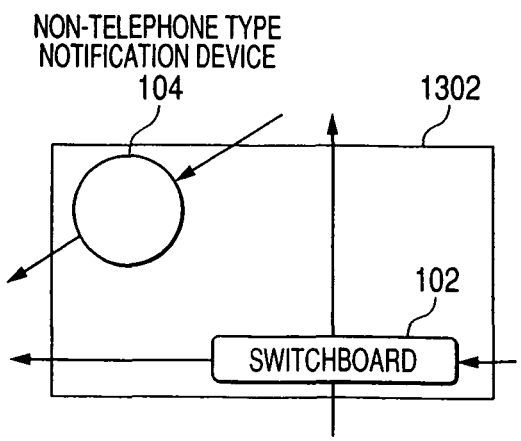

And, a non-telephone type notification device and a switchboard may be contained in a single enclosure to constitute an integrated all-in-one device as shown in FIG. 13C. This is convenient in the case of constituting the device as a switchboard in which the existing computer may be leveraged as a server, or in the case where it is desired to increase or expand only the server.

Figure 13D:
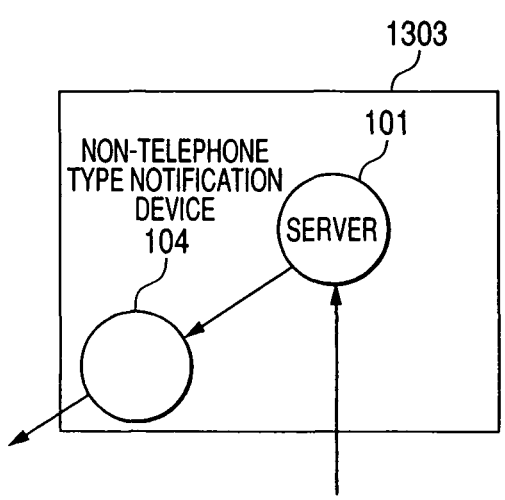

And, a server and a non-telephone type notification device may be contained in a single enclosure to constitute an integrated all-in-one device as shown in FIG. 13D. This is a configuration suitable in the case where a security function that the present invention aims to provide is additionally provided to the traditional telephone system by the existing switchboard.

When the function of various devices in FIG. 1 shown in FIGS. 13A to 13D is constituted as integrated all-in-one devices, and is controlled by software processing, each function may be performed by time-sharing by one computer within the device.

Figure 14:
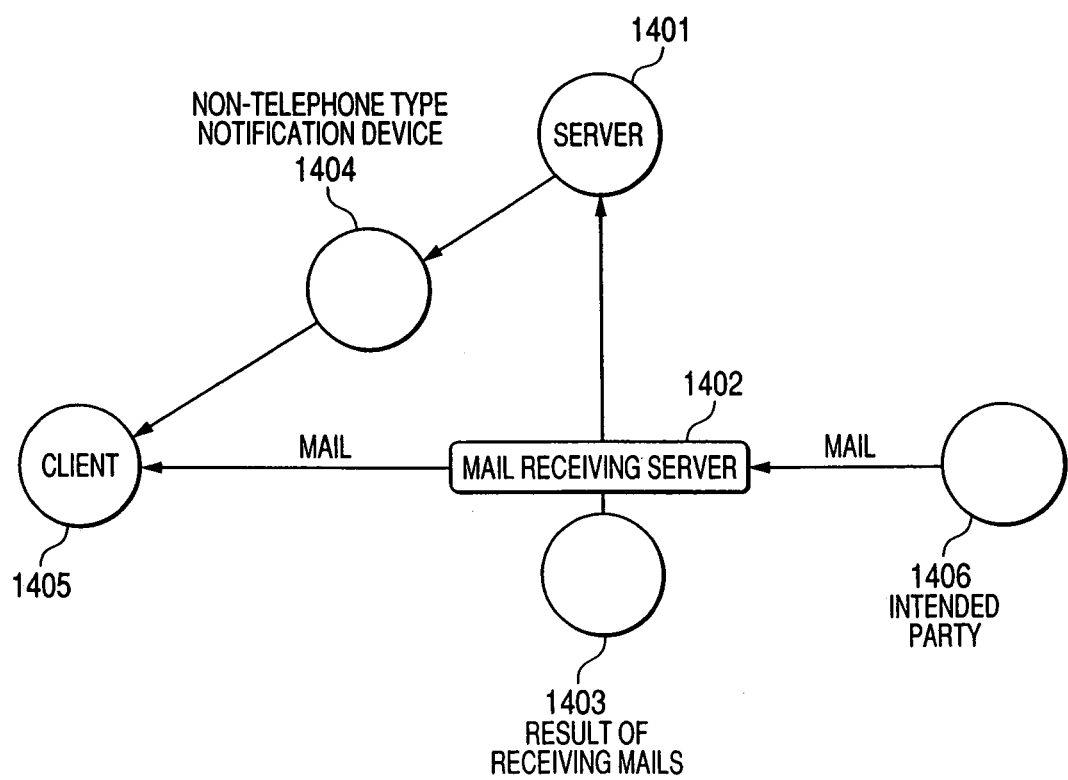
FIG. 14 is an embodiment of the present invention.

We will show an embodiment of using the present invention in mails of which the receipt is announced by a ring constituting one of the functions of a portable telephone (hereinafter referred to as "ring notification type mail") with reference to FIG. 14. Here, we assumed the case of receiving mails for a specific purpose (for example business mail), and we assumed also that these mails are not intended to be saved in the internal memory of the portable telephone. On the other hand, mails other than those for the specific purpose as mentioned above are intended to be saved in the portable telephone.

To begin with, when we have mails sent from an intended mail party, the mail address of the portable telephone is not notified, but the mail address of the mail receiving terminal (1403) controlled by the mail receiving server (1402) connected with the server located in the company premise or center or the like is notified. This does not directly lead to the reception of mails from the intended mail party to the client. Instead, for the client to receive mails, in the first place, the mail receiving terminal (1403) receives mails. The mail receiving server (1402) has both the mail reception control function and the mail transfer function. Upon receiving a mail, the mail receiving server immediately transfers the same to the client (1405) and thus can realize the reception of mail by the client (1405). However, in this case, the client (1405) will be in the same situation as receiving ordinary mails. If the client (1405) has a mail history function, the information of the received mails, in other words the mail address of the intended mail party (1406) which is the terminal of the mail sender and the accessory information remains. Therefore, by such simple transfer, it is impossible to classify the information of mails related to a specific purpose and not to allow it to remain in the terminal as the present invention aims to realize.

On the contrary, in the present invention, the mail receiving server (1412) connected with the server (1401), instead of simply transferring, holds temporarily the mail received by the center and sends the information relating to the received mail (sender information) to the client (1405) through a notification means different from the ring-type mail (non-ring type notification device, 1406). Then, the mail receiving server (1402) transfers the received mails to the client (1405).

Now, the non-ring type notification device expressly notifies the client (1405) that the mail sent from the mail receiving server (1402) following a notice is a mail for a specific purpose (for example business). Therefore, with this as a momentum the client can treat the information relating to the subsequent mails transferred from the mail receiving server as one not to be saved (or even if the call information is temporarily saved, it is deleted before the end of conversation or within a sufficiently short period of time after the end of conversation). This will enable the client to take steps to ensure that the information related to mails for a specific purpose would not remain within itself. On the other hand, upon receipt of notice of receipt of mail from the mail receiving server, the server (1401) starts saving the information relating to the mail, and therefore can record the information of the mail without losing the same. Incidentally, it is needless to say that the object of such mail is not necessarily limited to portable telephone, and any mobile information terminal having the ring notification-type mail function can be covered by the present invention.

FIG. 16 shows the data structure as the fourth embodiment of the present invention. In the present invention, at the time of previous notice of received mail by the client from the server through the non-telephone type notification device, the notice is given together with the type of received call. When such type of received call is included in the notice, the client can change processing of information relation to the call received after the reception of the notice. For example, with respect to the security level 1 type of received call, both the name of sender and the telephone number of the sender may be specified as not subject to saving, while with respect to the security level 2 type of received call, the telephone number of the sender only may be specified as not subject to saving, and the name of the sender may be saved. This enables to completely eliminate the information of call sent by a sender having a specially high security from the portable telephone even in the case of call for a specific purpose, and to leave the name of sender or a part of it for the information of call sent from a sender having a medium degree of security. Incidentally, such type of information may be registered as the information of the owner of such telephone number, when users register the telephone number in the server.

Figure 17:
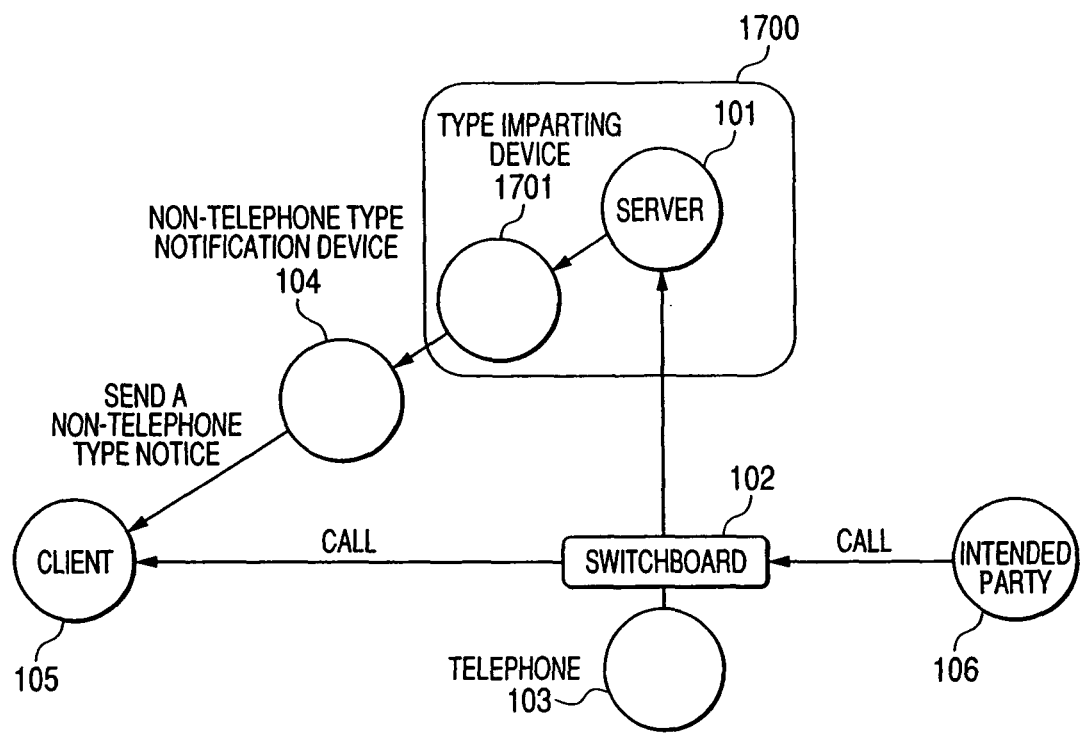
FIG. 17 represents a type imparting mechanism for notices of the present invention.

FIG. 17 shows the fifth embodiment of the present invention. Regarding the type to be imparted to the non-telephone type notices shown in FIG. 16, it is possible to reduce the burden of the user and to uniformalize the standard of imparting the type by having a server with the function of imparting the type (1700) impart automatically the type by using a type imparting device (1701). As described in FIG. 16, when the user registers a telephone number in the server, it is possible to register at the same time type as the information of owner of the telephone number. However, depending on the case, it will be complicated to allow the users impart type individually. And since such allocation (decision) of type involves different judgment depending on the user and depends on the judgment of the user at the moment, the criteria of judgment tends to be ambiguous. In order to solve such a problem, for example the users register in advance the type corresponding to the number of sender of the received call in a data base according to the inner standard of each company, and the type imparting device searches the data base mentioned above using the telephone number as the key to determine the type, and impart the same to the client. The adoption of such a system can eliminate the trouble of the user allocate individually the type, and enables to impart not so ambiguous type that does not involve individual difference or time difference.

FIG. 18 shows the sixth embodiment of the present invention. When the server imparts the type shown in FIG. 17, this system enables to impart the type depending on the model of portable telephone. The information of type of the portable telephone may be registered together with the user of the client. For example, when the model of the portable telephone is chosen as the type, it will be possible to impart a type that instructs to perform an operation characteristic of the model to the client using a specific type. For another example, it will be possible to decide a type in accordance with the organization. In such a case, with regard to a specific position, it will be possible to impart a type whereby even information with a high security may be partially saved.

Figure 19A:
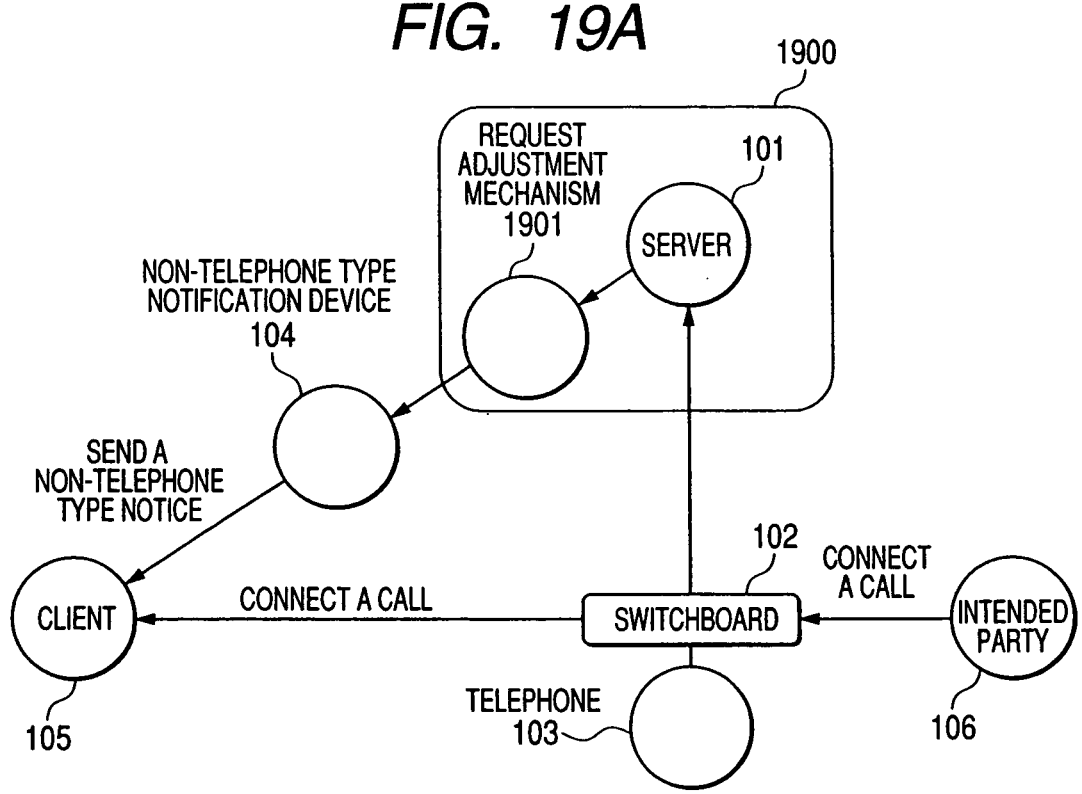
FIG. 19 represents a server with notice adjusting function of the present invention.
Figure 19B:
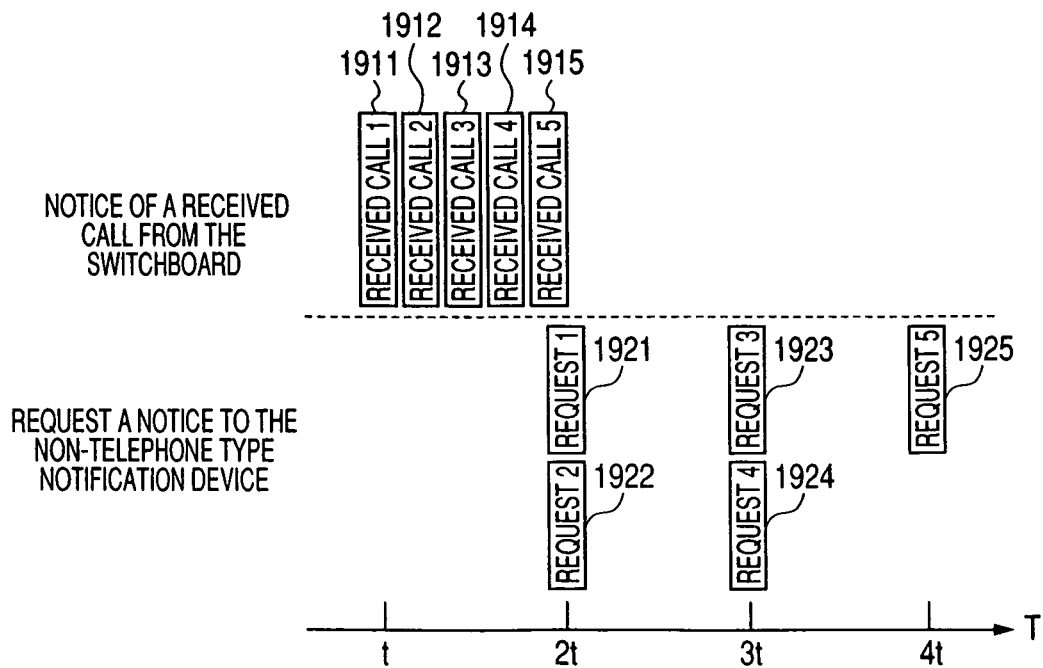

FIG. 19 shows the seventh embodiment of the present invention. When the notice sending capacity (for example, number of transmissions/minute) of the non-telephone notification device is low in relation with the notice requesting capacity (for example the number of requests/minute), a problem arises in that the whole system will be inoperative because requests beyond the capacity to send are no longer accepted by the non-telephone notification device (the server's requests are rejected). This is a problem that can arise when the non-telephone type notification device and the server are constituted as separate devices and when the processing capacity of only the server is increased. Such a problem can be solved by using a server with request adjusting function (1900) shown in FIG. 19(*a*). In other words, the server with request adjusting function (1900) does not make a request for notice to the non-telephone type notification device as soon as it receives a notice of received call from the switchboard. Instead, the server holds temporarily a notice of received call from the switchboard, and sends a fixed number of requests for notice to the non-telephone type notification device in accordance to a fixed time interval by using a request adjusting device (1901). For example, as shown in FIG. 19(*b*), if five calls were received in a fixed time interval t (1911-1915), if they are sent to the non-telephone type notification device as soon as they are received, and if the sending capacity of the non-telephone type notification device is low (two request per t hour), the device rejects requests corresponding to the third and subsequent received calls (1913-1915), and will be unable to process the received calls. However, it will be possible to solve the problem that arises by the rejection of requests by the non-telephone type notification device if, as shown in FIG. 19(*b*), these requests are adjusted so that they may be less than a predetermined number in a fixed number of hours (requests 1921 and 1922 at time t, 1923 and 1924 at 2t, and 1925 at 3t), even if a large number calls are received in a short period of time.

Figure 20:
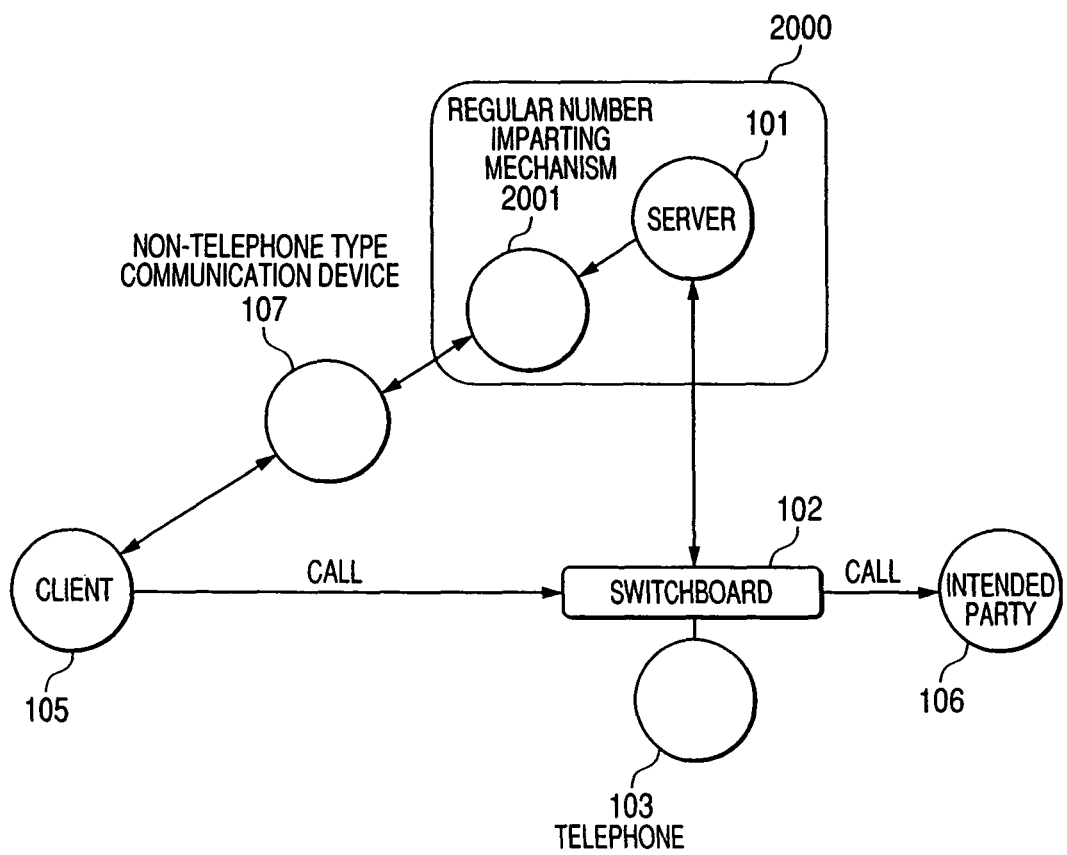
FIG. 20 represents a charge separating means in the present invention.

FIG. 20 shows the eighth embodiment of the present invention. In a portable telephone system according to the second aspect of the present invention, if calls are sent from a client, generally the client which is the sender is charged. Such a situation becomes a problem in a case where the client sends calls for two purposes, the first and the second, and it is desirable that the client will be charged for calls of the second purpose, and it is desirable that the client will not be charged for calls of the first purpose. FIG. 20 provides a means for solving such a problem. Here, when the client sends a call, the server notifies the client of the telephone number of the center telephone with a fixed number added thereto instead of informing the client of the number of the center telephone which will be the addressee of the client.

Generally, the telephone numbers called "free dial" are widely used, and this is constituted by the addition of a fixed number at the top of the telephone number. This system is intended to keep the telephone of the sender free of charge and to charge the telephone receiving the call. The present invention provides a system of charging the center telephone without charging the client side of the call of the first purpose by the server prompting the client to automatically send call by adding such fixed number and by specifying expressly the telephone number of the addressee. Such a system enables to easily separate charges without causing the user of the client to be aware of the addition of fixed number for using expressly a free dial and causing them to take operational trouble for adding the fixed number.

FIG. 21 shows another aspect of the eighth embodiment of the present invention. This embodiment provides a system that enables to change the choice of whether such separation of charge may be applied or not depending on the user of the client. According to the means shown in FIG. 20, when the charge is separated, it is possible to charge the center telephone side for the calls related to a specific purpose. However, it is impossible to separate charges depending on the user of the client. In order to solve such a problem, as shown in FIG. 21, this system is characterized by deciding the question of whether the fixed number is added or not depending on the charge class imparted to the client. The class imparted may be, for example, position in an organization. It will be possible that the clients owned by persons of a certain position or higher are not charged (charge class 1), and on the contrary the clients owned by persons of a certain position or lower are charged (charge class 2). And the class imparted to client may be distinguished by something like post in an organization. It will be possible that only the persons belonging to a specific post are kept free of charge.

What is claimed is:

1. A portable telephone system comprising:
a server;
a switchboard;
a telephone;
a non-telephone type notification device; and
a portable telephone,
wherein said server and said switchboard, said switchboard and said telephone, said server and said non-telephone type notification device, said non-telephone type notification device and said portable telephone, and said switchboard and said portable telephone are mutually connected;
wherein said server holds correspondence data describing a correspondence between a specific number specifying said telephone and a specific number specifying said portable telephone;
wherein said switchboard, upon detecting a received call to said telephone, notifies said server of the received call and the specific number of said telephone;
wherein said server, upon receiving a notice of a received call from said switchboard and the specific number of said telephone, instructs said switchboard to hold the received call, and detects said portable telephone corresponding to the specific number of said telephone from said correspondence data, and notifies said non-telephone type notification device of the specific number of said detected portable telephone;
wherein said non-telephone type notification device, upon receiving the specific number of said portable telephone from said server, sends a non-telephone type notice to said portable telephone;
wherein said server sends an instruction of transfer to said portable telephone of the received call giving instruction of said hold to said switchboard;
wherein said switchboard, upon receiving the instruction of transfer from said server, transfers the received call on hold to said portable telephone;
wherein said portable telephone classifies the type of incoming calls by a non-telephone type notice from said non-telephone type notification device, and determines the information relating to said incoming calls as not-to-be stored.

2. The portable telephone system according to claim 1, wherein the notice of received call that said non-telephone type notification device sends to said portable telephone includes information on the sender of the call received by said telephone contained in said notice of the received call.

3. The portable telephone system according to claim 1, wherein the notice of the received call that said server requests said non-telephone type notification device to send to said portable telephone includes the type of the received call contained in said notice of the received call.

4. The portable telephone system according to claim 3, wherein said server determines the type of the received call contained in said received call notice by using the telephone number of the sender of the received call and provides the information on type.

5. The portable telephone system according to claim 3, wherein said server determines the type of the received call contained in said received call notice by using the type of said portable telephone and imparts the information on type.

6. The portable telephone system according to claim 1, wherein said server requests said non-telephone type notification device to send a non-telephone type notice by making a number of not more than a predetermined number of requests in synchronization with a predetermined time interval in place of requesting to send a notice of the received call from said switchboard as soon as said server receives the same from the switchboard.

\* \* \* \* \*